United States Patent
Park

(10) Patent No.: US 11,999,546 B2
(45) Date of Patent: Jun. 4, 2024

(54) CABLE TIE

(71) Applicant: Kyoung Ho Park, Chungcheongnam-do (KR)

(72) Inventor: Kyoung Ho Park, Chungcheongnam-do (KR)

(*) Notice: Subject to any disclaimer, the term of this patent is extended or adjusted under 35 U.S.C. 154(b) by 523 days.

(21) Appl. No.: 17/287,475

(22) PCT Filed: Oct. 21, 2019

(86) PCT No.: PCT/KR2019/013801
§ 371 (c)(1),
(2) Date: Apr. 21, 2021

(87) PCT Pub. No.: WO2020/085730
PCT Pub. Date: Apr. 30, 2020

(65) Prior Publication Data
US 2021/0387779 A1 Dec. 16, 2021

(30) Foreign Application Priority Data
Oct. 22, 2018 (KR) .................. 10-2018-0125724

(51) Int. Cl.
*F16B 39/22* (2006.01)
*B65D 63/10* (2006.01)

(52) U.S. Cl.
CPC .............................. *B65D 63/1063* (2013.01)

(58) Field of Classification Search
CPC .. B65D 63/1063; B65D 63/1072; F16B 17/00
USPC ...................................................... 411/246
See application file for complete search history.

(56) References Cited

U.S. PATENT DOCUMENTS

| | | | | |
|---|---|---|---|---|
| 4,631,783 A * | 12/1986 | Hayashi | ................ | F16M 13/02 24/30.5 S |
| 4,805,856 A * | 2/1989 | Nicoli | ................ | F16L 3/233 292/307 R |
| 5,598,994 A * | 2/1997 | Olewinski | ................ | H02G 3/26 411/511 |
| 7,437,804 B1 * | 10/2008 | Geiger | ................ | F16L 3/237 248/74.3 |
| 7,926,767 B2 * | 4/2011 | Saltenberger | ........ | F16L 3/2334 24/17 AP |

(Continued)

FOREIGN PATENT DOCUMENTS

| | | |
|---|---|---|
| JP | H07317717 | 12/1995 |
| KR | 200394793 | 8/2005 |

(Continued)

*Primary Examiner* — Gary W Estremsky
(74) *Attorney, Agent, or Firm* — IPLA P.A.

(57) ABSTRACT

A cable tie for fixing a bundle of cables and the bound cables to a wall, includes: a fastening part having locking protrusions formed in the longitudinal direction of one surface thereof; a head part, which is integrally formed at the end portion of the fastening part, has an insertion hole, through which a free end of the fastening part passes, penetratingly formed in the center of the front surface thereof, and has a locking step formed at a lower part in the insertion hole so that the locking protrusion of the fastening part is fixed thereto; a connecting part integrally extending from the circumferential surface of the head part; and a bolt fastening part, which is formed at the front end portion of the connecting part.

3 Claims, 7 Drawing Sheets

(56) References Cited

U.S. PATENT DOCUMENTS

| | | | | |
|---|---|---|---|---|
| 8,069,599 B2 * | 12/2011 | Kitchen | ................. | G02C 11/00 |
| | | | | 40/665 |
| 8,328,146 B2 * | 12/2012 | Yeh | ......................... | H02G 3/30 |
| | | | | 248/71 |
| 9,309,033 B2 * | 4/2016 | Dorsey | ................. | B65D 63/00 |
| 9,895,485 B1 * | 2/2018 | McNeill | .............. | A61M 5/1415 |
| 2003/0088948 A1 * | 5/2003 | Cook | ................... | F16L 3/2336 |
| | | | | 24/16 PB |
| 2008/0066265 A1 * | 3/2008 | Pilon | .................... | F16L 3/2336 |
| | | | | 24/16 PB |
| 2013/0067695 A1 * | 3/2013 | Giotto | ............... | B65D 63/1072 |
| | | | | 24/16 PB |
| 2017/0227141 A1 * | 8/2017 | Toll | ...................... | F16L 3/1075 |

FOREIGN PATENT DOCUMENTS

| | | |
|---|---|---|
| KR | 20150064060 | 6/2015 |
| KR | 20170138969 | 12/2017 |

\* cited by examiner

CABLE TIE

BACKGROUND

The present invention relates to a cable tie used for cleaning up cables, and more particularly, to a cable tie for fixing a bundle of cables and bound cables on a wall not to move.

In general, a cable tie is used to bundle up and fix not only wires connected into household electrical appliances, such as computers, television sets, refrigerators and the likes, but also cables likes various communication lines in order to arrange them at the right place neatly.

As shown in FIGS. 1 and 2, a conventional cable tie includes: a fastening part 2 having locking protrusions compactly formed on one side thereof in a longitudinal direction; and a head part 5 which is formed integrally with an end portion of the fastening part 2 and has an insertion hole 3 penetrated at the center of the front surface so that a free end of the fastening part 2 passes through the insertion hole 3 and a locking jaw 4 formed at an inner lower portion of the insertion hole 3 so that the locking protrusions 1 of the fastening part 2 can be fixed.

However, the conventional cable tie has no problem in tying outside wires (W) to clean up the wires neatly, but cannot hold the wires (W) not to move if the wires (W) move by a user's pulling or by an external force like wind. So, the conventional cable tie has a disadvantage in that it cannot fix the wires (W) perfectly.

That is, the conventional cable tie can tie up a plurality of wires (W) into a bundle of the wires (W), but cannot fix the wires (W) onto a wall body to prevent movement of the wires (W). So, when the wire (W) moves, a terminal combined with the end portion of the wire is also moved, and it causes a short circuit and becomes a cause of a bad connection.

SUMMARY OF THE INVENTION

Accordingly, the present invention has been made in an effort to solve the above-mentioned problems occurring in the prior arts, and it is an object of the present invention to provide a cable tie which can tie a plurality of wires or cables into a bundle and fix the bound wires or cables on a fixing part like a wall body using a bolt, thereby maintaining a firm arrangement state even though an external force pulling the wires or cables is generated.

It is another object of the present invention to provide a cable tie for maintaining the bolt fastened to the wall body in a stable installation state due to bolt loosening prevention protrusions.

To achieve the above objects, the present invention provides a cable tie including: a fastening part having locking protrusions formed in a longitudinal direction of one surface thereof; a head part, which is integrally formed at an end portion of the fastening part, has an insertion hole, through which a free end of the fastening part passes, penetratingly formed in the middle of the front surface thereof, and has a locking jaw formed at a lower portion in the insertion hole so that the locking protrusion of the fastening part is fixed thereto; a connecting part integrally extending from the circumferential surface of the head part; and a bolt fastening part, which is formed at the front end portion of the connecting part, and includes a flange having a circumferential surface formed in any one shape among a circle, a square and a polygon, a bolt fastening hole perforated at the central portion of the flange, and a plurality of bolt loosening prevention protrusions protruding, like a toothed washer structure in any one shape from among a triangular pyramid, a rectangle, a semicircle, and a polygon, along the inner peripheral surface of the flange having the bolt fastening hole.

Moreover, the connecting part has a plurality of bolt interval adjusting holes perforated at regular intervals to adjust a fastening interval of a bolt.

Furthermore, the bolt loosening prevention protrusions have the same thickness as the flange or are formed thin to have a stepped jaw.

Additionally, the fastening part has at least one auxiliary bolt fastening hole.

In another aspect of the present invention, the present invention provides a cable tie, which includes: a fastening part having locking protrusions formed compactly in a longitudinal direction of one surface thereof; and a head part, which is integrally formed at an end portion of the fastening part, has an insertion hole, through which a free end of the fastening part passes, penetratingly formed in the middle of the front surface thereof, and has a locking jaw formed at a lower portion in the insertion hole so that the locking protrusion of the fastening part is fixed thereto, further including: a bolt fastening part, which is formed at the head part, and includes a flange having a circumferential surface formed in any one shape among a circle, a square and a polygon, a bolt fastening hole perforated at the central portion of the flange, and a plurality of bolt loosening prevention protrusions protruding, like a toothed washer structure in any one shape from among a triangular pyramid, a rectangle, a semicircle, and a polygon, along the inner peripheral surface of the flange having the bolt fastening hole.

The cable tie according to an embodiment of the present invention can tie a plurality of wires or cables into a bundle and fix the bound wires or cables on a fixing part like a wall body using a bolt so as to maintain a firm arrangement state even though an external force pulling the wires or cables is generated, thereby increasing convenience and safety in arrangement of wires or cables.

DETAILED DESCRIPTION OF THE INVENTION

Figure 1:
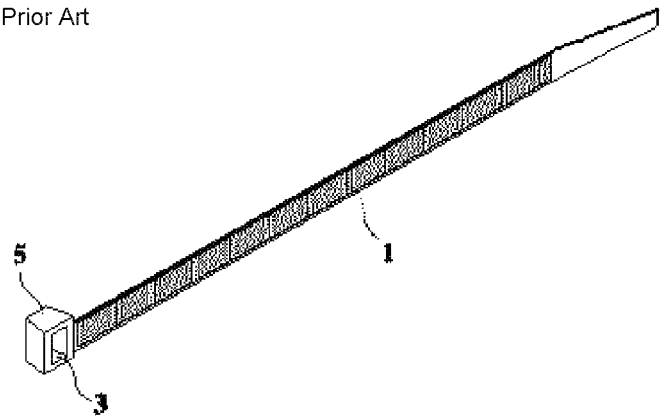
FIG. 1 is a perspective view showing a conventional cable tie.
Figure 2:
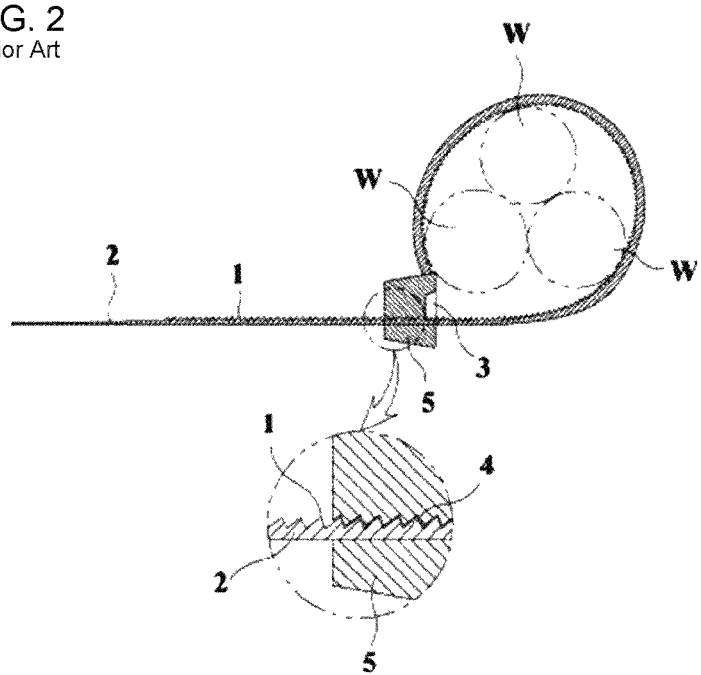
FIG. 2 is an exemplary view showing a state where wires or cables are bound by the conventional cable tie.

Hereinafter, exemplary embodiments of the present invention will be described with reference to the accompanying drawings. In the drawings, the same elements will be designated by the same reference numerals although they are shown in different drawings.

Furthermore, in the following description of the present invention, a detailed description of known functions and configurations incorporated herein will be omitted when it may make the subject matter of the present invention rather unclear. In addition, preferred embodiments of the present invention will be described herein below, the technical thought of the present invention is not restricted or limited thereto and may be embodied in various manners through modification by those skilled in the art.

Figure 3:
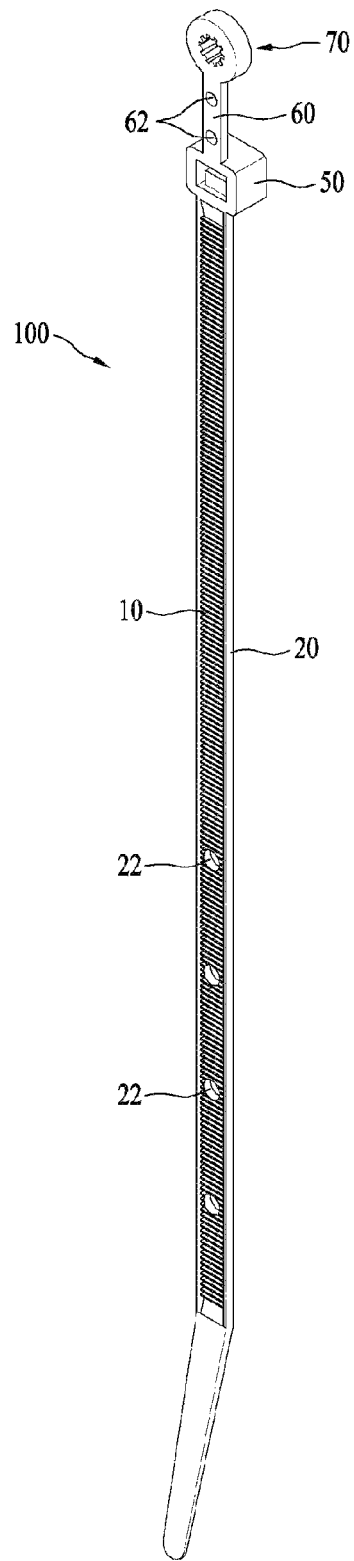
FIG. 3 is a perspective view showing a cable tie according to a preferred embodiment of the present invention.
Figure 4:
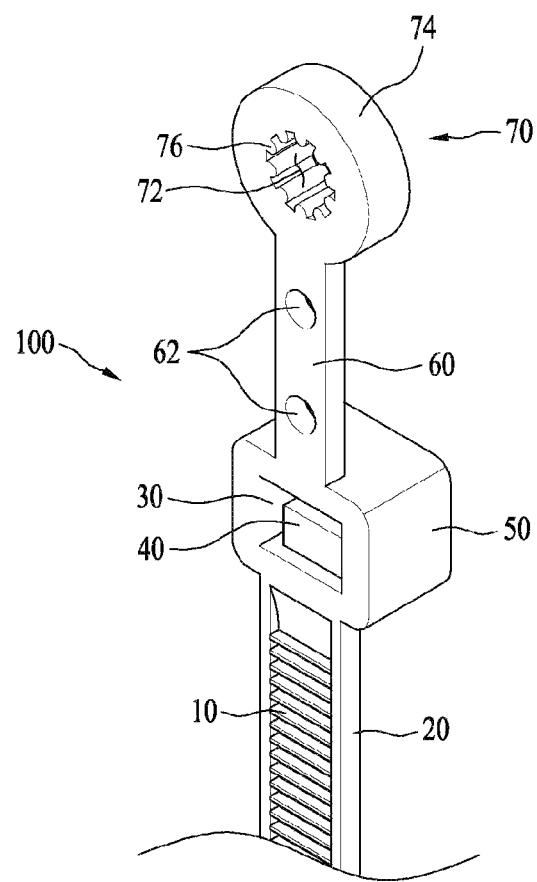
FIG. 4 is a partially enlarged exemplary view of the cable tie according to the preferred embodiment of the present invention.
Figure 5:
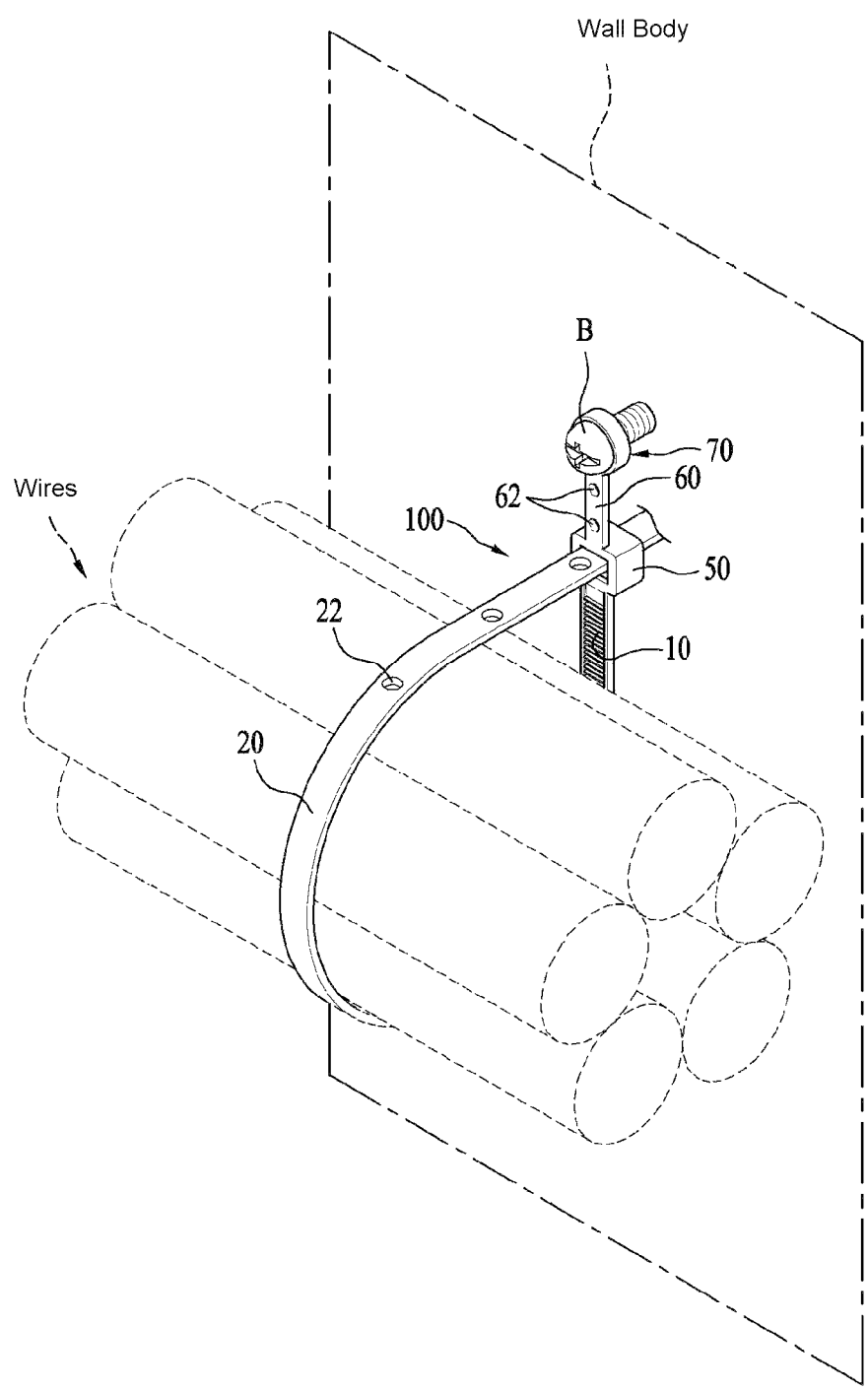
FIG. 5 is a perspective view showing a state where wires or cables are bound and fixed by the cable tie according to the preferred embodiment of the present invention.
Figure 6:
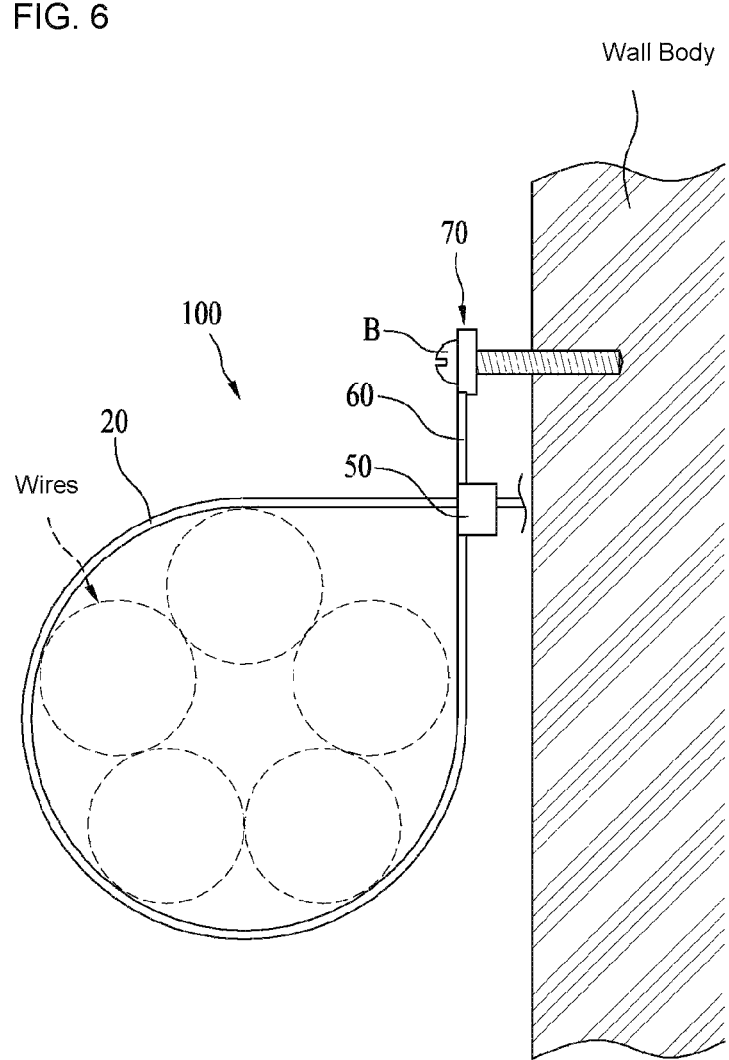
FIG. 6 is a side view showing a state where wires or cables are bound and fixed by the cable tie according to the preferred embodiment of the present invention.
Figure 7:
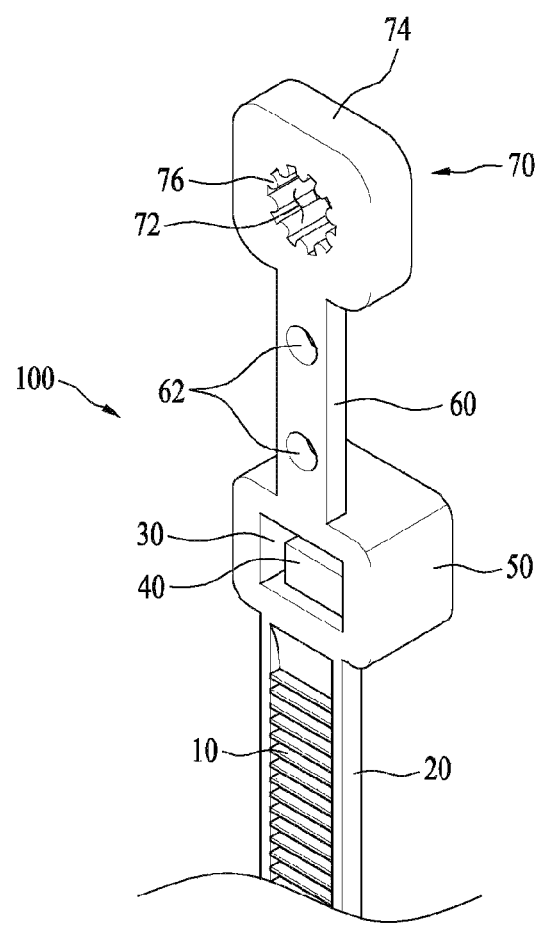
FIG. 7 is an exemplary view showing a cable tie according to another preferred embodiment of the present invention.
Figure 8:
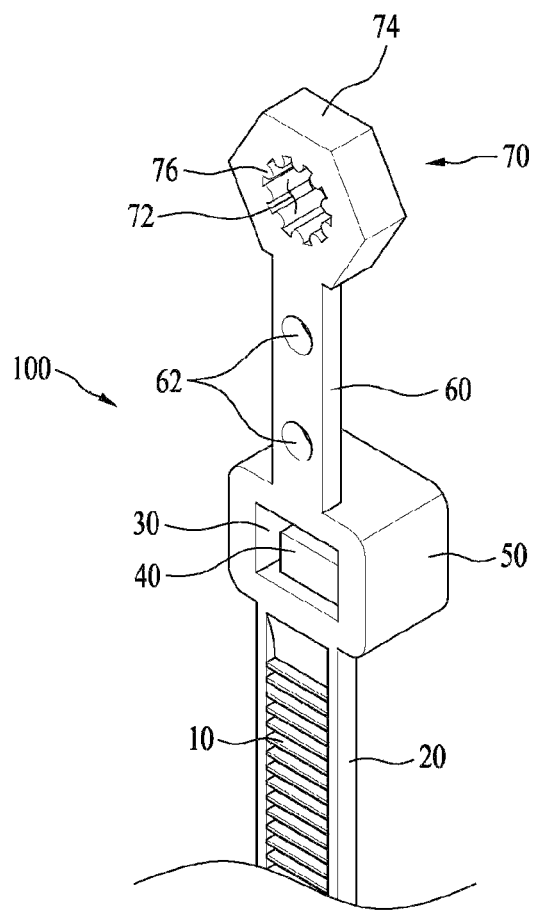
FIG. 8 is an exemplary view showing a cable tie according to a further preferred embodiment of the present invention.

FIG. 3 is a perspective view showing a cable tie according to a preferred embodiment of the present invention, FIG. 4 is a partially enlarged exemplary view of the cable tie according to the preferred embodiment of the present invention, FIG. 5 is a perspective view showing a state where wires or cables are bound and fixed by the cable tie according to the preferred embodiment of the present invention, FIG. 6 is a side view showing a state where wires or cables are bound and fixed by the cable tie according to the preferred embodiment of the present invention, FIG. 7 is an exemplary view showing a cable tie according to another preferred embodiment of the present invention, and FIG. 8 is an exemplary view showing a cable tie according to a further preferred embodiment of the present invention.

As shown in the drawings, the cable tie 100 according to the preferred embodiment of the present invention includes a fastening part 20, a head part 50 formed integrally with the fastening part 20, a connecting part 60 integrally extending from the head part 50, and a bolt fastening part 70 formed at a front end portion of the connecting part 60.

The fastening part 20 is injection-molded of synthetic resin, and is formed into a flat bar type to keep a predetermined width. The fastening part 20 has a plurality of locking protrusions 10 compactly arranged on one side thereof and a free end (there is no reference numeral) formed at a lower end portion thereof without the locking protrusions 10. The locking protrusions 10 are arranged to maintain a predetermined slope like ratchet protrusions.

Auxiliary bolt fastening holes 22 are perforated in the middle part of the lower end portion of the fastening part 20 at regular intervals. The auxiliary bolt fastening holes 22 are not essential, and may be formed at the fastening part 20 or may be omitted.

The head part 50 is formed integrally at an end portion of the fastening part 20. The head part 50 includes an insertion hole 30 perforated in the head part 50 so that the free end of the fastening part 20 can pass through. A locking jaw 40 is formed at a lower portion of the insertion hole 30 so that the locking protrusion 10 of the fastening part is fixed to the locking jaw 40.

Therefore, when the front end portion of the fastening part 20 is inserted and fit to the insertion hole 30 of the head part after the fastening part 20 surrounds the outer surface of wires or cables, the locking jaw 40 formed at the lower portion of the insertion hole 30 is caught to the locking protrusion 10 formed on the outer surface of the fastening part 20 in such a way that the fastening part 20 is fit and fastened only in one direction.

Such a structure of the fastening part 20 and the head part 50 is the same as typical cable ties which are being sold in the market, and it is natural that the structure is applicable to the cable tie 100 of the present invention.

In the meantime, the technical feature of the preferred embodiment of the present invention is that the connecting part 60 and the bolt fastening part 70 are integrally extended to the outside of the head part 50.

The connecting part 60 is integrally extended from the head part 50 to maintain the same axial line as the fastening part 20. The connecting part 60 may be manufactured to have a distinguished color so that a person can rapidly recognize the connecting part even in the dark.

In this instance, the connecting part 60 may be manufactured to maintain the same thickness as the fastening part 20 and to maintain the same width as the fastening part 20.

The length of the connecting part 60 may be varied according to the overall size of the cable tie 100. For instance, the connecting part 60 is 30 mm in length if the fastening part 20 is 300 mm in length, and is 50 mm in length if the fastening part 20 is 500 mm in length.

That is, the length of the connecting part 60 may be about a tenth of the length of the fastening part 20, but it is just an example of the present invention. So, it is not necessary to manufacture the connecting part to be a tenth of the fastening part 20. If the length of the connecting part 60 is more than 20 mm, since the connecting part 60 can be bent or curved with less power, the location and the direction of the connecting part 60 can be adjusted easily.

Therefore, in this embodiment of the present invention, the connecting part 60 may be manufactured to maintain the length of about 20 mm to 50 mm, but of course, the length of the connecting part 60 is variable according to the length of the fastening part 20.

Moreover, the connecting part 60 has a plurality of bolt interval adjusting holes 62 perforated at regular intervals. The bolt interval adjusting holes 62 located at the place where it is assumed that movement of the wires or cables is the least is subsidiarily formed to fasten a bolt after the connecting part adjoins a wall body or a structure.

Additionally, not shown in the drawing, but at least one connecting part 60 may be extended from the head part 50. That is, a pair of the connecting parts 60 may be formed in such a way that the width of each connecting part 60 is a half of the width of the fastening part 20. The reason is to increase fixing force of the wires or cables using the connecting parts 60 in case that the wires or the cables are very heavy when the cable tie 100 is fixed onto the wall body.

When there are a pair of the connecting parts 60, it is natural that a pair of the bolt fastening parts 70 are disposed at the front end portion of the connecting part 60.

As shown in FIGS. 6 and 7, the bolt fastening part 70 includes a bolt fastening hole 72, a flange 74 formed in any one among a circle, a rectangle, and a polygon, and bolt loosening prevention protrusions 76 protruding inwardly along the inner surface of the flange 74.

The bolt fastening part 70 may be manufactured in such a way that the bolt fastening hole 72 is perforated to be 1 mm to 10 mm in diameter and the flange 74 is 5 mm to 20 mm in diameter. The diameters of the bolt fastening hole 72 and the flange 74 of the bolt fastening part correspond the outer diameter of the bolt (B) to be joined and the diameter of the head, and the above-mentioned sizes may be varied according to the size of the bolt (B).

Here, the flange 74 has various shapes in order to effectively correspond to a shape of a flange washer (not shown) formed integrally with the head part of the bolt when it is tightened. If the flange washer is formed in a circular shape, the flange 74 of a circular shape is used, and if the flange washer is formed in a square or a polygon, the flange of the corresponding shape is used.

For instance, if the bolt fastening part 70 having the bolt fastening hole of the rectangular shape and the flange of the rectangular shape is used when the flange washer has the circular shape, it is difficult to provide a great fixing force since a contact area that the bottom surface of the flange washer gets in contact with the flange is narrow.

Therefore, if the flange having the same shape as the flange washer is used, since the contact area gets wider, even though the wires or cables are heavy, the cable tie can effectively support the wires or cables.

Moreover, the bolt fastening hole 72 of the flange 74 has the bolt loosening prevention protrusions 76 to prevent the fastened bolt from being separated by vibration.

The bolt loosening prevention protrusions 76 have the structure of a toothed washer to serve as a spring washer or toothed washer to prevent the fastened bolt from being separated, and may have any one among a triangular pyramid, a rectangle, a semicircle, and a polygon.

That is, in case of the bolt loosening prevention protrusions 76, the number and the length of protrusions protruding inwardly according to the size of the bolt fastening hole 72 may be varied. Finally, while the bolt is fastened to the bolt fastening hole 72, a screw thread of the bolt penetrates through the bolt loosening prevention protrusions 76 till the bolt is fastened perfectly. Therefore, the bolt loosening prevention protrusions 76 limit rotation of the screw thread of the bolt after the bolt is fastened to the wall body so as to prevent a release of the bolt.

In this instance, the bolt loosening prevention protrusions 76 are formed thin so as to have the same thickness as the flange 74 or to form a stepped portion when being viewed from one side.

Since the bolt loosening prevention protrusions 76 are formed on the bolt fastening hole 72, when the cable tie 100 of the present invention is mounted on an outdoor unit of an air conditioner or any one of various electric devices driven by a motor, the bolt is not loosened easily and can keep a stably mounted state.

Meanwhile, in another preferred embodiment of the present invention, not shown in the drawings, but a head part 50 does not have a connecting part 60, and a bolt fastening part 70 includes bolt loosening prevention protrusions 76 formed on the bolt fastening hole 72 and the inner surface, and a flange 74 having an outer form of any one among a semicircle, a rectangle and a polygon.

That is, the connecting part 60 is omitted from the head part 50, and the bolt fastening part 70 is directly formed on the head part 50.

In case that the bolt fastening part 70 is formed integrally with the outside of the head part 50, the cable tie is fit for surrounding one or two thin wires.

Hereinafter, referring to the attached drawings, a process of tying and fixing wires using the cable tie according to the preferred embodiment of the present invention will be described.

FIGS. 5 and 6 illustrate that wires or cables are bound with the cable tie 100 according to the preferred embodiment of the present invention and a bolt is combined and fixed with the bolt fastening part 70 in order to fix the bound wires or cables to a wall body.

As illustrated in the drawings, a plurality of wires or cables are bound with the cable tie 100 of the present invention, the connecting part 60 is bent toward the wall body to adjoin the wall body, and then, a bolt is fastened to the bolt fastening part 70 so that the bound wires or cables can be fixed to the wall body neatly.

In this instance, when the wires or cables are bound with the cable tie 100 of the present invention and a bolt is fastened to the bolt fastening part 70, if the wires or cables are very heavy, it deteriorates workability since a user has to hold all of the wires or cables with one hand and fastens the bolt.

Therefore, in order to fix the wires or cables onto the wall body the most conveniently, the user bends the connecting part 60, arranges the bolt fastening part 70 to adjoin the wall body, matches and fastens the bolt to the bolt fastening hole 72, ties the outer surfaces of the wires or cables with the fastening part 20, and then, inserts the front end portion of the fastening part 20 into the insertion hole 30 of the head part so as to be fastened. Then, the cable tie according to the preferred embodiment of the present invention can rapidly fix the wires or cables onto the wall body even though the wires or cables are very heavy.

On the contrary, it is also possible that the user ties the wires or cables with the cable tie 100, and then, fastens the bolt into the bolt fastening hole 72 in a state where the bolt fastening part 70 gets in contact with the wall body.

As described above, the method for fixing the cable tie 100 on the wall body using the bolt may be performed according to the user's selection. However, when the bolt is fastened, during the process that the lower end portion of the bolt is inserted into the bolt fastening hole 72, the bolt is fixed to the wall body while the bolt loosening prevention protrusions 76 are caught to the screw thread of the bolt, so that the bolt can keep the fastened state if the cable tie 100 is not cut off even though a relatively heavy structure is fixed to the ceiling or to a vertical wall surface.

In this instance, when the bolt is fastened to the bolt fastening part 70, if an interval between the wall body and the wires or cables is narrow, it may be judged that the connecting part 60 is too long.

Then, the user selects the most suitable one among the bolt interval adjusting holes 62 formed in the connecting part 60 to fasten the bolt to the wall body.

In the drawings of the present invention, it is illustrated that the bolt loosening prevention protrusions 76 are not formed on the bolt interval adjusting holes 62, but if necessary, the bolt loosening prevention protrusions 76 may be formed on every bolt interval adjusting hole 62.

Therefore, the cable tie 100 according to the preferred embodiment of the present invention allows the user to conveniently tie and fix wires or cables and allows the user to fix the wires or cables onto the ceiling conveniently and stably, thereby being effectively mounted and used at various places, such as inside and outside buildings and offices, inside vehicles, on electric devices, and on various articles.

As described above, while the present invention has been particularly shown and described with reference to the example embodiments thereof, it will be understood by those of ordinary skill in the art that the above embodiments of the present invention are all exemplified and various changes, modifications and equivalents may be made therein without changing the essential characteristics and scope of the present invention. Therefore, it would be understood that the embodiments disclosed in the present invention are not to limit the technical idea of the present invention but to describe the present invention, and the technical and protective scope of the present invention shall be defined by the illustrated embodiments. It should be also understood that the protective scope of the present invention is interpreted by the following claims and all technical ideas within the equivalent scope belong to the technical scope of the present invention.

The invention claimed is:

1. A cable tie comprising:
   a fastening part having locking protrusions formed in a longitudinal direction of one surface thereof;
   a head part, which is integrally formed at an end portion of the fastening part, has an insertion hole, through which a free end of the fastening part passes, penetratingly formed in the middle of the front surface thereof, and has a locking jaw formed at a lower portion in the insertion hole so that the locking protrusion of the fastening part is fixed thereto;
   a connecting part integrally extending from the circumferential surface of the head part; and
   a bolt fastening part, which is formed at the front end portion of the connecting part, and includes a flange having a circumferential surface formed in any one shape among a circle, a square and a polygon, a bolt fastening hole perforated at the central portion of the flange, and a plurality of bolt loosening prevention protrusions protruding, like a toothed washer structure in any one shape from among a triangular pyramid, a rectangle, a semicircle, and a polygon, along the inner peripheral surface of the flange having the bolt fastening hole,
   wherein the connecting part has a plurality of bolt interval adjusting holes perforated at regular intervals to adjust a fastening interval of a bolt.

2. The cable tie according to claim 1, wherein the bolt loosening prevention protrusions have the same thickness as the flange or are formed thin to have a stepped jaw.

3. The cable tie according to claim 1, wherein the fastening part has at least one auxiliary bolt fastening hole.

* * * * *